United States Patent
Carr et al.

(10) Patent No.: US 10,718,246 B2
(45) Date of Patent: Jul. 21, 2020

(54) PUMPS AND HYDRAULIC CIRCUITS INCLUDING VENTURI ASSEMBLY

(71) Applicant: Micropump, Inc., A Unit of IDEX Corporation, Vancouver, WA (US)

(72) Inventors: Charles Carr, Battle Ground, WA (US); David J. Grimes, Beaverton, OR (US)

(73) Assignee: Micropump, Inc., a Unit of IDEX Corporation, Vancouver, WA (US)

( * ) Notice: Subject to any disclaimer, the term of this patent is extended or adjusted under 35 U.S.C. 154(b) by 415 days.

(21) Appl. No.: 15/719,210

(22) Filed: Sep. 28, 2017

(65) Prior Publication Data
US 2018/0087425 A1    Mar. 29, 2018

Related U.S. Application Data

(60) Provisional application No. 62/401,087, filed on Sep. 28, 2016.

(51) Int. Cl.
*F01N 3/20*    (2006.01)
*F04F 5/54*    (2006.01)
(Continued)

(52) U.S. Cl.
CPC .............. *F01N 3/208* (2013.01); *F04B 23/10* (2013.01); *F04B 49/065* (2013.01); *F04B 53/08* (2013.01);
(Continued)

(58) Field of Classification Search
CPC ......... F01N 2610/02; F01N 2610/1406; F01N 2610/144; F01N 2610/1453;
(Continued)

(56) References Cited

U.S. PATENT DOCUMENTS

| 9,897,053 | B2 * | 2/2018 | Kolhouse | F02M 53/043 |
| 2010/0288850 | A1 * | 11/2010 | Ibrahim | F02M 53/043 |
| | | | | 239/132 |

(Continued)

FOREIGN PATENT DOCUMENTS

| DE | 10 2012 215394 | 3/2014 |
| EP | 2 131 020 | 12/2009 |
| EP | 2 647 803 | 10/2013 |

OTHER PUBLICATIONS

International Search Report and Written Opinion Issued in related International Application No. PCT/US2017/054104, dated Dec. 1, 2017, 12 pp.

*Primary Examiner* — Phutthiwat Wongwian
*Assistant Examiner* — Diem T Tran
(74) *Attorney, Agent, or Firm* — Klarquist Sparkman, LLP

(57) ABSTRACT

A hydraulic circuit includes a pump in fluid communication with a reservoir containing a liquid to be pumped. The pump includes an inlet and an outlet. The hydraulic circuit also includes a venturi pump in fluid communication with the reservoir and with the outlet of the pump, and an injection valve including a cooling feature. The injection valve is in fluid communication with the outlet of the pump, and is configured to dispense liquid supplied to the injection valve by the pump. The cooling feature is in fluid communication with the venturi pump. The pump is configured to produce a first flow of liquid, and the hydraulic circuit is configured to supply a first portion of the first flow of liquid to the injection valve for dispensing by the injection valve and a second portion of the first flow of liquid to the venturi pump.

20 Claims, 12 Drawing Sheets

(51) Int. Cl.
  *F04F 5/10* (2006.01)
  *F04C 2/08* (2006.01)
  *F04C 11/00* (2006.01)
  *F16K 49/00* (2006.01)
  *F04B 53/08* (2006.01)
  *F04B 23/10* (2006.01)
  *F04B 49/06* (2006.01)

(52) U.S. Cl.
  CPC ............ *F04C 2/084* (2013.01); *F04C 11/005* (2013.01); *F04F 5/10* (2013.01); *F04F 5/54* (2013.01); *F16K 49/005* (2013.01); *F01N 2610/02* (2013.01); *F01N 2610/144* (2013.01); *F01N 2610/1406* (2013.01); *F01N 2610/1453* (2013.01); *F01N 2900/04* (2013.01); *F04B 2205/09* (2013.01)

(58) Field of Classification Search
  CPC .. F01N 2900/04; F01N 3/208; F04B 2205/09; F04B 23/10; F04B 49/065; F04B 53/08; F04C 11/005; F04C 2/084; F04F 5/10; F04F 5/54; F16K 49/005
  See application file for complete search history.

(56) References Cited

U.S. PATENT DOCUMENTS

| | | | |
|---|---|---|---|
| 2011/0214643 A1* | 9/2011 | Blizard | F02M 53/02 123/468 |
| 2013/0205756 A1 | 8/2013 | Levin et al. | |
| 2016/0032804 A1* | 2/2016 | Liljestrand | F01N 3/24 60/274 |
| 2016/0040575 A1* | 2/2016 | Zhang | F01N 3/208 60/274 |
| 2016/0084129 A1 | 3/2016 | McFarland et al. | |
| 2016/0305298 A1 | 10/2016 | Murst et al. | |

* cited by examiner

PUMPS AND HYDRAULIC CIRCUITS INCLUDING VENTURI ASSEMBLY

CROSS REFERENCE TO RELATED APPLICATION

This application claims priority to and the benefit of U.S. Provisional Patent Application No. 62/401,087 filed on Sep. 28, 2016, which is incorporated herein by reference in its entirety.

FIELD

This application pertains to hydraulic circuits including a pump to produce a first flow of liquid and a venturi pump to produce a second flow of liquid using a portion of the first flow of liquid as a working fluid.

BACKGROUND

Selective Catalytic Reduction (SCR) systems are used to reduce nitrogen oxide compounds from the exhaust gases of, for example, power plants, marine vessels, and automobiles by injection of a liquid reagent into the exhaust gas stream. As emissions standards have become more stringent and SCR technology has become more widely adopted, the reagent delivery volume and pressure requirements have increased to achieve finer atomization of the reagent liquid by the delivery or dosing unit, among other reasons. However, delivering large liquid volumes at high pressure requires relatively large pumps and powerful motor assemblies, which increases the size, weight, energy requirements, and costs of the SCR system. Accordingly, improvements to SCR systems are desirable.

SUMMARY

Certain embodiments of the disclosure concern pumps and hydraulic circuits including a venturi assembly or a venturi pump. In a representative embodiment, a hydraulic circuit comprises a pump in fluid communication with a reservoir containing a liquid to be pumped, wherein the pump includes an inlet and an outlet. The hydraulic circuit further comprises a venturi pump in fluid communication with the reservoir and with the outlet of the pump, and an injection valve including a cooling feature. The injection valve is in fluid communication with the outlet of the pump, and is configured to dispense liquid supplied to the injection valve by the pump. The cooling feature is in fluid communication with the venturi pump. The pump is configured to produce a first flow of liquid, and the hydraulic circuit is configured to supply a first portion of the first flow of liquid to the injection valve for dispensing by the injection valve, and a second portion of the first flow of liquid to the venturi pump.

In another representative embodiment, a method comprises producing a first flow of a liquid from a reservoir with a pump, supplying a first portion of the first flow of the liquid to an injection valve, and supplying a second portion of the first flow of the liquid to a venturi pump. The method further comprises, with the venturi pump, producing a second flow of the liquid from the reservoir and combining the second flow of the liquid with the second portion of the first flow of the liquid to produce a venturi pump liquid flow. The method further comprises supplying the venturi pump liquid flow to a cooling feature of the injection valve.

In another representative embodiment, a system comprises a pump in fluid communication with a reservoir containing a liquid to be pumped. The pump includes an inlet and an outlet, and is configured to produce a first flow of liquid. The system further comprises a venturi pump in fluid communication with the reservoir and with the outlet of the pump. The venturi pump is configured to receive a portion of the first flow of liquid, to produce a second flow of liquid from the fluid reservoir, and to combine the received portion of the first flow of liquid with the second flow of liquid to produce a venturi pump flow of liquid. The system further comprises an internal combustion engine, and an injection valve including a coolant jacket. The injection valve is in fluid communication with the outlet of the pump, and is configured to inject liquid supplied by the pump into exhaust gases produced by the internal combustion engine. The coolant jacket is in fluid communication with the venturi pump, and is configured to receive the venturi pump flow of liquid. The system further comprises a controller configured to vary a flow rate of the first flow of liquid produced by the pump based at least in part on a flow rate of fuel supplied to the internal combustion engine.

The foregoing and other objects, features, and advantages of the disclosed technology will become more apparent from the following detailed description, which proceeds with reference to the accompanying figures.

DETAILED DESCRIPTION

Figure 1:
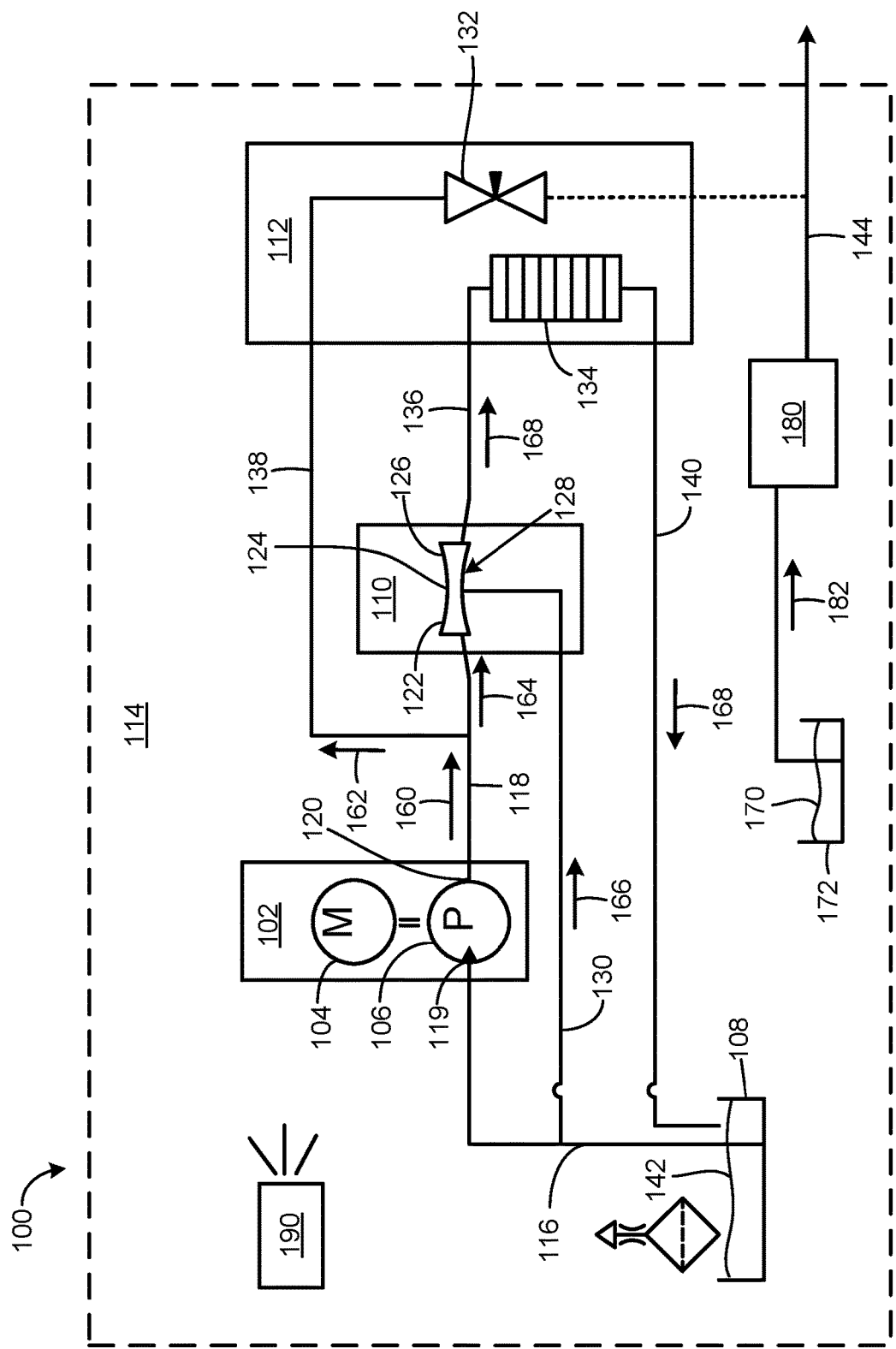
FIG. 1 is a schematic illustration of a representative embodiment of a hydraulic circuit including a pump, a venturi pump, and a fluid utility unit incorporated into a vehicle.

FIG. 1 illustrates a representative embodiment of a hydraulic circuit 100. The hydraulic circuit 100 can be configured for use in, for example, a Selective Catalytic Reduction (SCR) system to reduce the nitrogen oxides ($NO_x$) emitted by an internal combustion engine 180 of a vehicle 114 in which the hydraulic circuit 100 is incorporated. As used herein, the term "vehicle" refers to any vehicle that has a power source (e.g., an engine), or any similar engine application. A vehicle or an engine application can include an automobile (such as a car, truck, tractor-trailer, or a recreational vehicle, a motorhome, etc., a boat or a ship, a military vehicle), a power generator, or other stationary engine application, to name a few.

The hydraulic circuit 100 can include a pump 102 including a pump-driver portion (e.g., a motor) 104 coupled to a pump-head portion 106, and configured to induce liquid to flow through the hydraulic circuit. Upstream of the pump 102, there is a liquid reservoir 108 containing a liquid 142 to be pumped. A venturi pump 110 and a fluid utility unit 112 configured as an injector assembly can each be located downstream of the pump 102. As used herein, a "venturi pump" is an apparatus that uses the Venturi effect to produce a flow of liquid. A "venturi pump flow" is a flow of liquid supplied by a venturi pump.

In the illustrated implementation, an inlet 119 of the pump-head 106 is in fluid communication with the reservoir 108 via a first supply line 116. A fluid line 118 can extend between an outlet 120 of the pump-head 106 and an inlet 122 of a venturi tube schematically illustrated at 124 and located in the venturi assembly 110. The venturi tube 124 has an outlet 126 and an intermediate portion 128 with a relatively smaller diameter than the inlet 122 and the outlet 126. In this manner, the intermediate portion 128 is configured to accelerate a liquid passing through it in accordance with Bernoulli's Principle. It should be understood that in alternative configurations, the venturi tube 124 can include any suitable feature (e.g., a flow restriction) that causes acceleration of the liquid passing through it. A second supply line 130 can extend from the first supply line 116 to the intermediate portion 128 of the venturi tube 124. Alternatively, the second supply line 130 can also be in direct fluid communication with the reservoir 108, as desired.

The fluid utility unit 112 can include an injector 132 (also referred to as an injection valve), and a cooling feature configured as channels or passages (e.g., a coolant jacket of the injection valve) schematically illustrated at 134. The cooling feature 134 can be, for example, defined in a housing containing the fluid utility unit 112. The cooling feature 134 can be configured to cool the components of the injector assembly by circulating a liquid supplied by a fluid line 136 extending from the outlet 126 of the venturi tube 124 to the inlet of the cooling feature 134. Meanwhile, a fluid line 138 can extend from the line 118 to the inlet of the injector 132. A return line 140 can also extend from the outlet of the cooling feature 134 back to the reservoir 108. In this manner, the venturi pump 110 and the fluid utility unit 112 can be fluidly connected in parallel in the hydraulic circuit, with both assemblies being supplied by a common fluid line 118 coupled to the outlet of the pump 102, while the liquid supplied to the cooling feature 134 is returned to the reservoir 108 and the liquid supplied to the injector 132 is discharged by the injector.

In the exemplary SCR system embodiment shown in FIG. 1, the liquid 142 can be an aqueous solution containing a reagent to convert nitrogen oxides ($NO_x$) present in engine exhaust schematically represented at 144 into diatomic nitrogen ($N_2$) and other products such as water ($H_2O$) and/or carbon dioxide ($CO_2$). In certain examples, the aqueous solution can be an aqueous ammonia solution ($NH_3(aq)$) or a urea solution ($CO(NH_2)_2$). In certain examples, the engine 180 can be a compression-ignition engine, such as a diesel engine, or a spark-ignition engine, such as a gasoline engine. Injection of the aqueous reagent solution into the exhaust stream 144 of the engine 180 can reduce the amount of nitrogen oxide compounds emitted by the engine.

In operation, the pump 102 can draw aqueous reagent 142 from the reservoir 108 via the supply line 116 and provide a first flow of relatively high-pressure liquid reagent represented by arrow 160 to the fluid line 118. For example, in an exemplary embodiment, the pump 102 can supply liquid at a flow rate of 250 mL per minute at a pressure of 10 bar to the fluid line 118. A first portion 162 of the first flow 160 (e.g., 20% of the first flow, or 50 mL at a pressure of 10 bar), can be supplied to the injector 132 for injection into the exhaust gas flow 144. Meanwhile, a second portion of the first flow represented by arrow 164 (e.g., the remainder of the liquid supplied to line 118 by the pump, or 200 mL per minute in this example) can be fed through the venturi tube 124 of the venturi pump 110. As the liquid passes through the relatively narrow intermediate portion 128 of the venturi tube, the liquid is accelerated. This can induce a pressure drop in the fluid line 130 in accordance with Bernoulli's Principle, such that the venturi pump 110 draws a second flow of liquid 166 from the reservoir 108 into the fluid line 130, and into the venturi tube 124. In this manner, the second portion 164 of the first flow 160 can act as the working fluid of the venturi pump.

The venturi pump 110 can combine the second flow 166 from the reservoir 108 (entering the venturi pump from the fluid line 130) with the second portion 164 of the first flow 160 of liquid (entering the venturi pump from the fluid line 118). The combined second flow 166 and the second portion 164 of the first flow 160 is represented as venturi pump flow 168, and can have a relatively higher flow rate and lower pressure than the first flow 160. The venturi pump flow 168 is fed from the outlet 126 of the venturi tube 124, through a fluid line 136, and to the cooling feature 134. At the cooling feature 134, the liquid can pass through the cooling channels or passages to cool the injector 132. This can also pre-heat the liquid passing through the cooling feature. The liquid exiting the cooling feature 134 can then be returned to the reservoir 108 by the return line 140. In the exemplary embodiment described herein, the flow rate of the venturi pump flow 168 can be 1,000 mL per minute at a pressure of 0.5 bar.

In certain embodiments, the flow rate of the venturi pump flow 168 produced by the venturi pump can be from 2 times to 10 times greater than the flow rate of the first flow 160 produced by the pump 102. In a specific embodiment, the venturi pump flow 168 can be 5 times greater than the first flow 160. Meanwhile, the pressure of the first flow 160 can be from 2 times greater to 50 times greater than the pressure of the venturi pump flow 168. In a specific embodiment, the pressure of the first flow 160 produced by the pump 102 can be 20 times greater than the pressure of the venturi pump flow 168.

In certain embodiments, the flow rate of the first flow 160 of liquid produced by the pump 102 can be controlled by a controller 190. The controller 190 can be, for example, an engine control unit, or another controller or computing device, and can be in communication with sensors, other onboard computers, etc., located on the vehicle 114. In certain examples, the controller 190 can control the flow rate produced by the pump 102 (e.g., by varying the speed of the pump-driver 104) according to, for example, a flow rate of fuel 170 supplied to the engine 180 from a fuel tank 172. The fuel flow to the engine 180 is schematically represented by arrow 182. In this manner, as the flow rate of fuel supplied to the engine 180 increases (e.g., during vehicle acceleration), the controller 190 can transmit control signals to increase the speed of the pump 102, thereby increasing the flow rate of the first flow 160 supplied to the hydraulic circuit by the pump. This, in turn, can cause a corresponding increase in the flow rate of the second flow 166 and the venturi pump flow 168 produced by the venturi pump 110. In this manner, the controller 190 can control the flow rate of aqueous reagent provided to the injector 132 such that an appropriate volume of liquid is supplied for injection into the exhaust gas stream 144 according to the rate of fuel consumption by the engine. The controller 190 can also control the flow rate of reagent provided to the cooling feature 134 by the venturi pump 110 to meet the cooling requirements of the injector according to the rate of fuel consumption by the engine.

Figure 2:
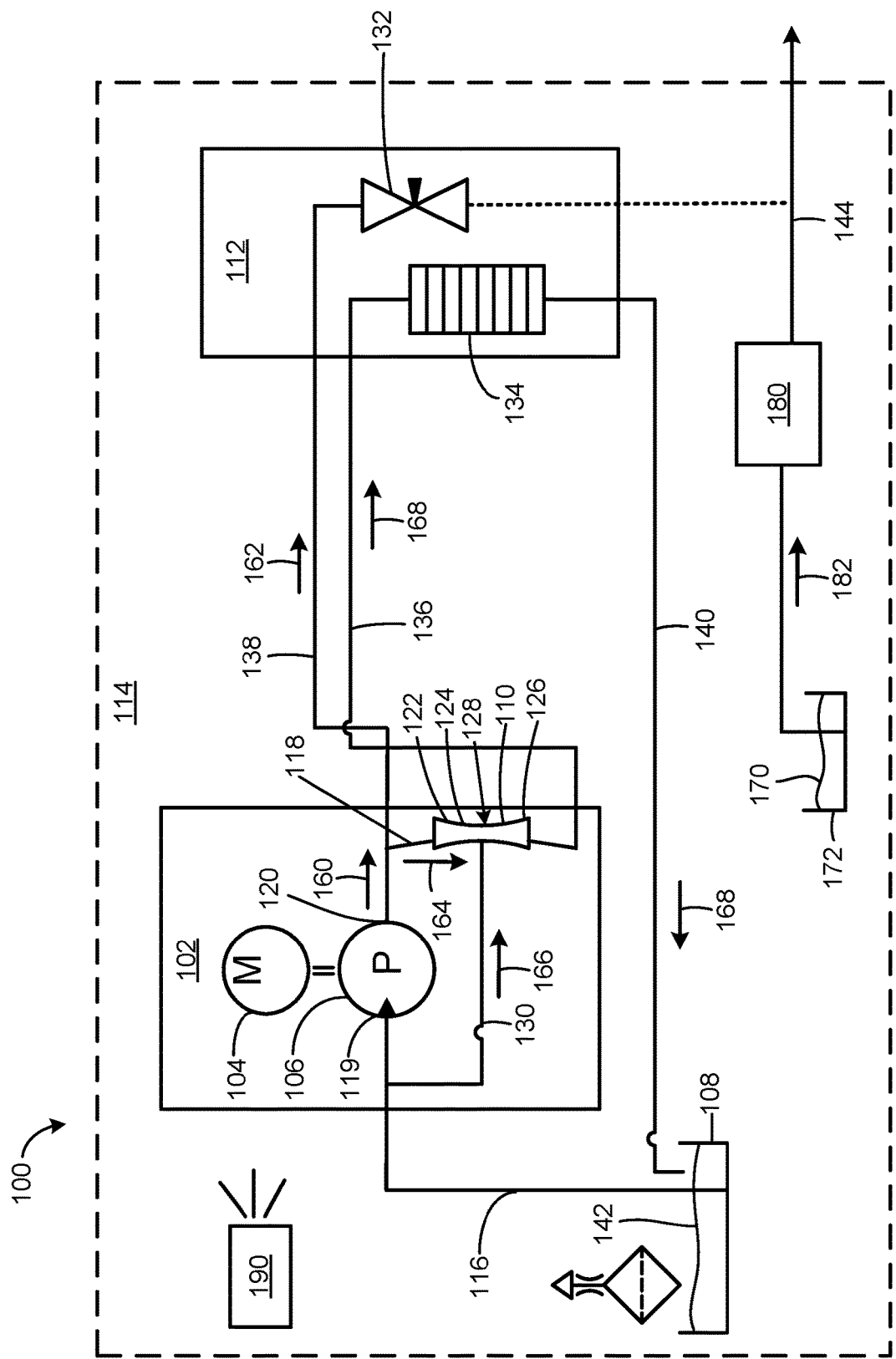
FIG. 2 is a schematic illustration of another embodiment of the hydraulic circuit of FIG. 1 in which the venturi pump is incorporated into the pump.
Figure 3:
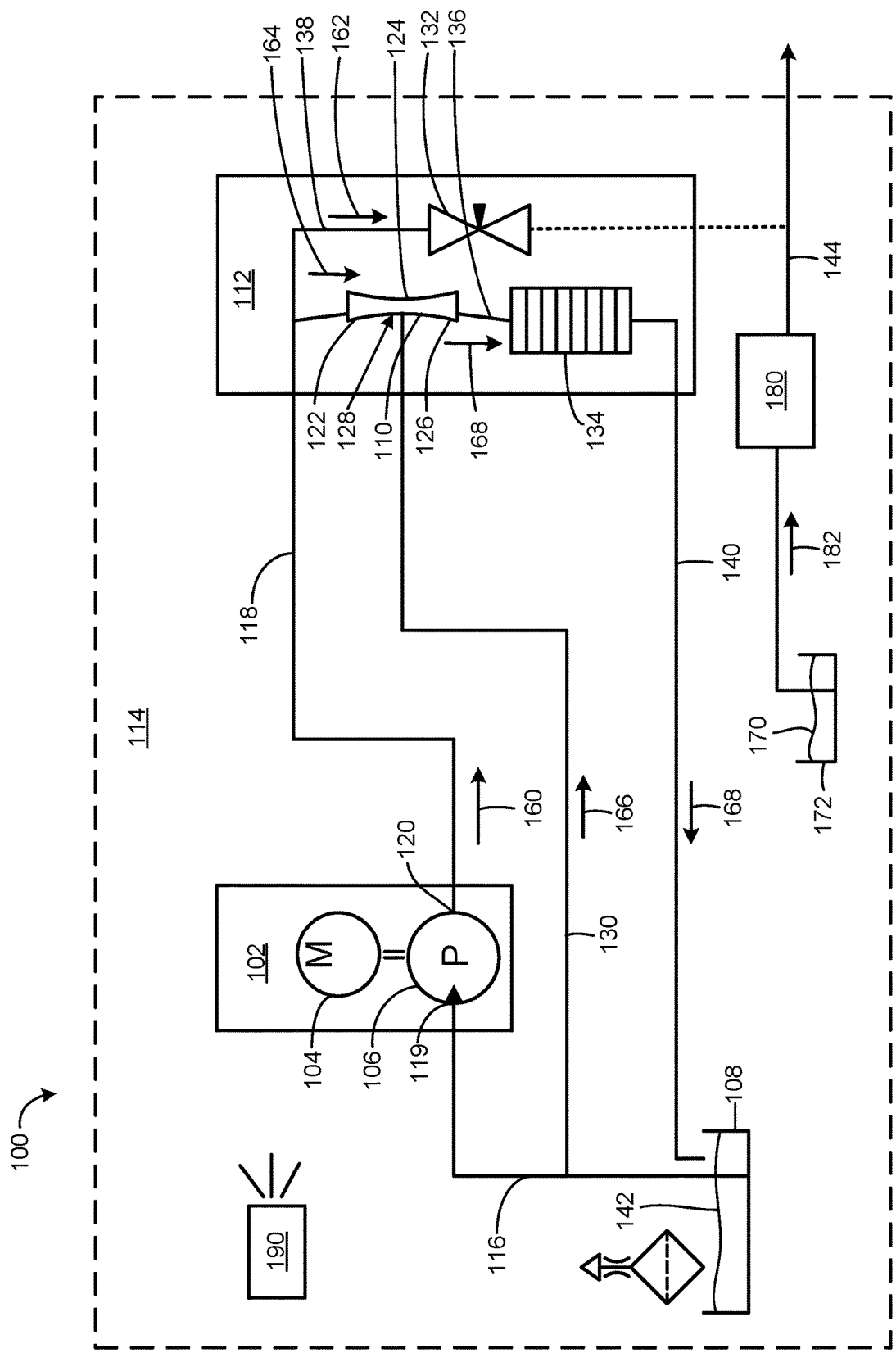
FIG. 3 is a schematic illustration of another embodiment of the hydraulic circuit of FIG. 1 in which the venturi pump is incorporated into the fluid utility unit.

The venturi pump 110 and the pump 102 can be located at any suitable location in the hydraulic circuit and, in some embodiments, can be co-located, or incorporated into a single component or a single housing. FIGS. 2 and 3 illustrate additional configurations of the hydraulic circuit 100. Referring to FIG. 2, in some embodiments the venturi pump 110 can be incorporated into the pump 102. For example, the venturi pump 110 can be incorporated with the pump-driver 104 and the pump-head 106 in a common housing, or incorporated into the pump-head itself. In such a configuration, the pump-head 106 and/or the housing in which the pump-head and the venturi pump are co-located can have separate outlets for the relatively higher-pressure flow of the pump-head 106 and the relatively lower pressure flow of the venturi pump 110. Alternatively, in the embodiment illustrated in FIG. 3, the venturi pump 110 can be incorporated into the fluid utility unit 112 (e.g., incorporated into a common housing with the injector 132 and the cooling feature 134). In all of these configurations, the venturi pump 110 can be fluidly connected in parallel with the fluid utility unit 112, and configured to use a portion of the high-pressure liquid flow produced by the pump 102 as a working fluid for the venturi pump to produce a second flow of liquid at a higher flow rate and a lower pressure.

Figure 8:
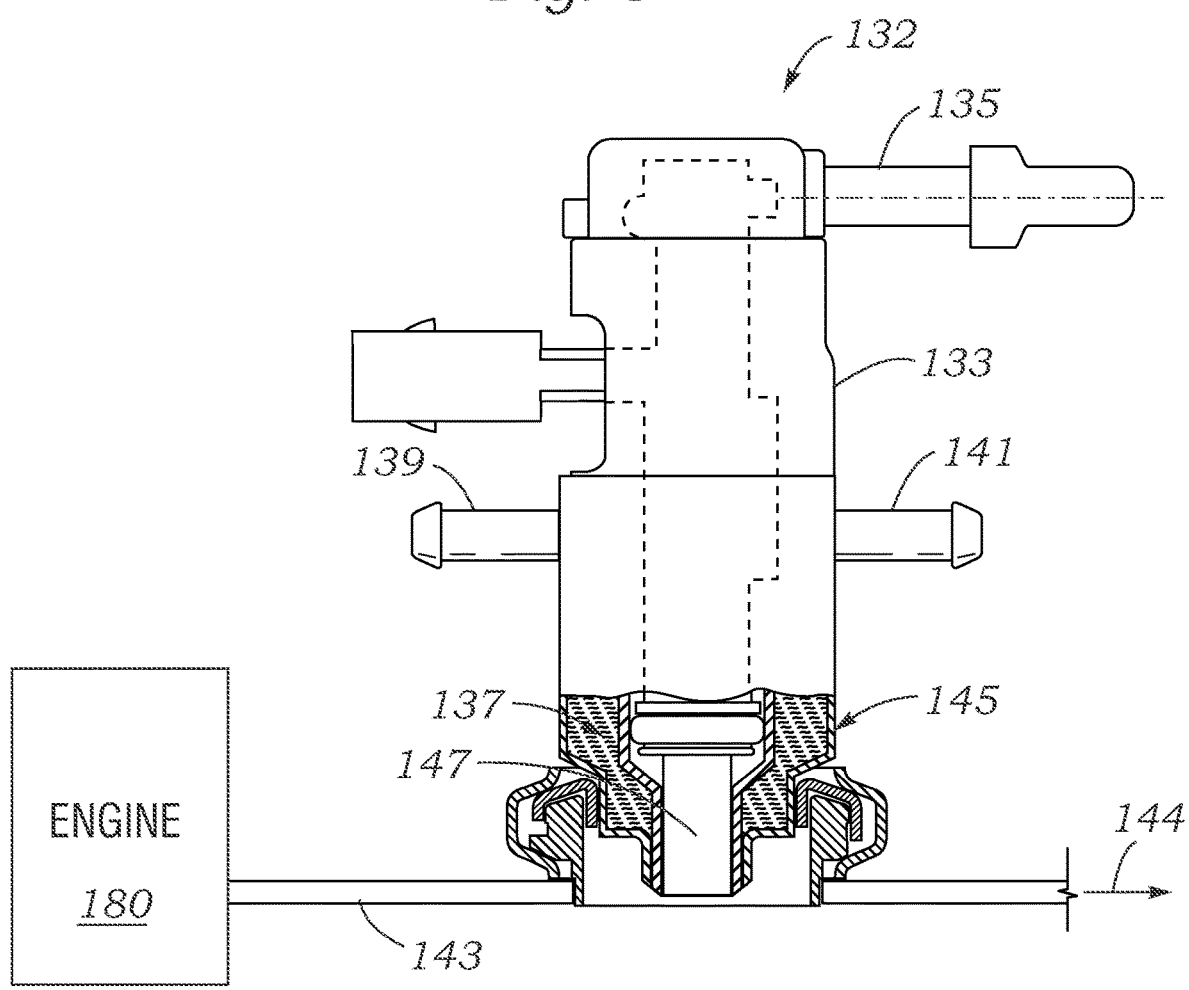
FIG. 8 is a side elevation view illustrating a representative embodiment of an injection valve.

FIG. 8 illustrates a representative example of an injector or injection valve 132 that can be used in combination with any of the hydraulic circuits described herein. In certain embodiments, the injector 132 can be a diesel exhaust fluid delivery valve or "dosing unit" configured to inject an aqueous reagent solution into an exhaust stream from a diesel engine to reduce nitrogen oxide emissions. The injector 132 can include a valve housing 133 including a nozzle portion 145, a valve inlet 135, and a cooling feature configured as a coolant jacket 137. A movable valve body 147 can be situated in the nozzle portion 145 to selectively dispense liquid from the nozzle portion. The coolant jacket 137 can at least partially surround the nozzle portion 145. The injector 132 can further include a coolant jacket inlet 139 and a coolant jacket outlet 141. The coolant jacket inlet 139 can be in communication with the fluid line 136 (FIG. 1), and the coolant jacket outlet 141 can be in fluid communication with the fluid line 140 (FIG. 1) such that liquid can be circulated from the venturi pump 110, through the coolant jacket 137 of the injector 132, and back to the reservoir 108 to cool the injection valve 132. As illustrated in FIG. 8, the valve body 133 of the injector 132 can be in fluid communication with an exhaust gas flow 144 in a manifold 143 from the engine 180.

Figure 9:
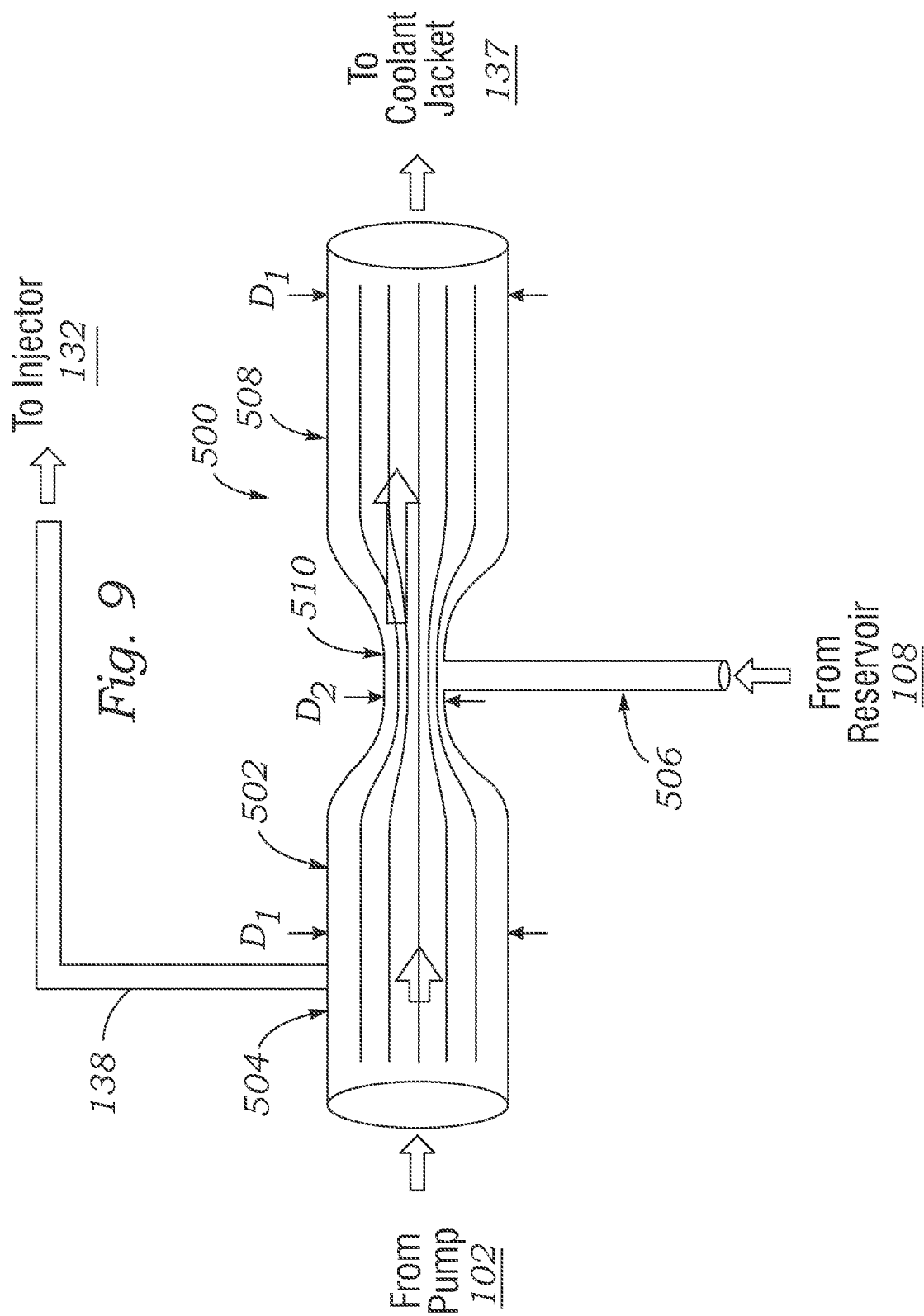
FIG. 9 is a side elevation view illustrating a representative embodiment of a venturi pump including a venturi tube with a converging throat portion.
Figure 10:
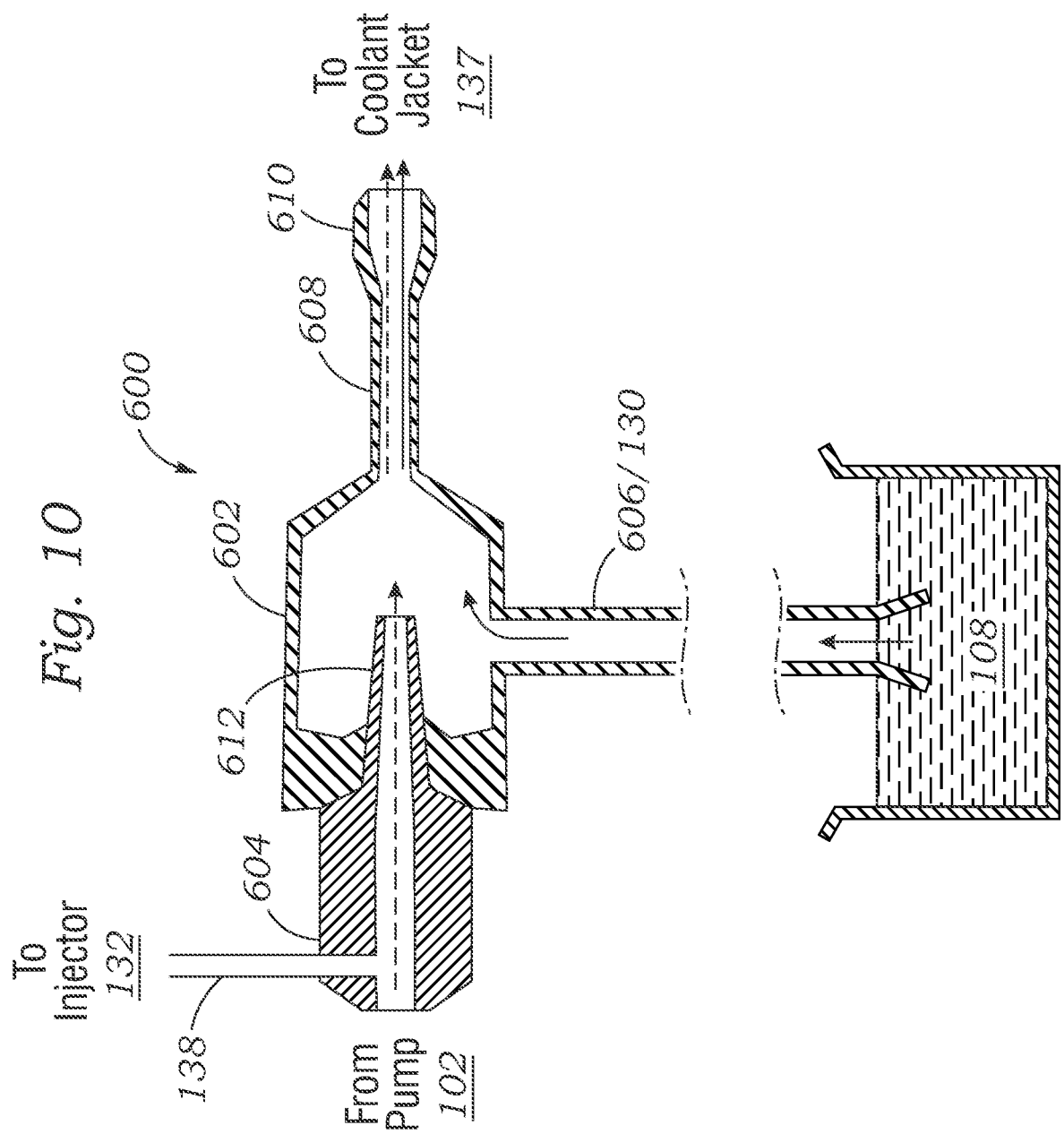
FIG. 10 is a cross-sectional view of another embodiment of a venturi pump including a suction chamber.

FIGS. 9 and 10 illustrate representative embodiments of venturi pumps that can be used in combination with the hydraulic circuits described herein. FIG. 9 illustrates a venturi pump 500 including a venturi tube 502 having a low-pressure inlet portion 506, a high-pressure inlet portion 504, an outlet portion 508, and an intermediate or throat portion 510 located between the high-pressure inlet portion 504 and the outlet portion 508. In the illustrated configuration, the low-pressure inlet portion 506 is coupled to the venturi tube 502 at the throat portion 510. In certain configurations, the low-pressure inlet portion 506 can be in fluid communication with the fluid reservoir 108 (e.g., via the fluid line 130 of FIG. 1), and the high-pressure inlet portion 504 can be in fluid communication with the outlet of the pump 102 (e.g., via the fluid line 118 of FIG. 1).

In the illustrated configuration, the high-pressure inlet portion 504 and the outlet portion 508 can have a first diameter $D_1$, and the tube can converge to a second diameter $D_2$ that is smaller than the first diameter $D_1$ at the throat portion 510. As liquid reagent from the high-pressure inlet 504 enters the throat portion 510, the liquid is accelerated, and draws a flow of liquid reagent through the low-pressure inlet portion 506 (e.g., from the reservoir 108) into the venturi tube 502. The liquid flow from the low-pressure inlet portion 506 and the liquid flow from the high-pressure inlet portion 504 are combined in the throat portion 510. The combined liquid flow can then flow out of the outlet portion 508 as a venturi pump flow to, for example, the coolant jacket 137 of the injection valve 132 (FIG. 8), as described above. A portion of the fluid line 138 is also shown in communication with the high-pressure inlet portion 504 of the venturi tube to direct a portion of the liquid flow produced by the pump 102 to the injection valve 132. In some embodiments, the fluid line 138 can be coupled directly to the venturi tube 502, as illustrated in FIG. 9, or coupled to the fluid line 118 upstream of the venturi tube, as shown in FIG. 1.

In certain embodiments, a ratio of the diameter $D_1$ to the diameter $D_2$ can be 2:1 to 5:1. For example, in a representative embodiment, the diameter $D_1$ can be 10 mm, and the diameter $D_2$ can be 2 mm. In other embodiments, the venturi tube 502 need not include the throat portion 510, and can have a constant diameter between the inlet and outlet portions, depending upon the particular flow characteristics desired.

FIG. 10 illustrates another configuration of a venturi pump 600 including a venturi tube configured as a suction chamber 602. The venturi pump can further include a high-pressure inlet portion 604 coupled to and in fluid communication with the suction chamber 602. The high-pressure inlet portion 604 can be in fluid communication with the outlet of the pump 102 via, for example, the fluid line 118 (see FIG. 1). In the configuration of FIG. 10, the high-pressure inlet portion 604 is in fluid communication with the fluid line 138, which is shown extending from the high-pressure inlet portion 604 and leading to the injection valve 132. However, in other embodiments, the fluid line 138 can be coupled to the fluid line 118 upstream of the venturi tube, similar to the configuration illustrated in FIG. 1.

The suction chamber 602 can also include a low-pressure inlet portion 606 in fluid communication with the fluid reservoir 108 via, for example, the fluid line 130. An outlet portion 608 can extend from the suction chamber 602, and can include a nipple 610 for connecting to, for example, the fluid line 136 (FIG. 1) leading to the coolant jacket 137 of the injection valve. In the illustrated embodiment, the high-pressure inlet portion 604 can include a nozzle portion 612 extending into the suction chamber 602. In certain configurations, the nozzle portion 612 can have a diameter that decreases in a direction toward the nozzle outlet such that the nozzle portion 612 accelerates the flow of high-pressure liquid into the suction chamber 602 to enhance the Venturi effect. However, in other embodiments, the fitting 604 can have a constant diameter leading into the suction chamber 602.

As liquid reagent at high pressure is supplied to the suction chamber 602 through the high-pressure inlet portion 604, the pressure drop in the suction chamber 602 can induce a flow of liquid reagent into the suction chamber at a lower pressure through the low-pressure inlet portion 606. The combined liquid flow from the high-pressure inlet portion 604 and the low-pressure inlet portion 606 can then flow out of the venturi pump 600 through the outlet portion 608 of the suction chamber 602 as a venturi pump flow, and can be delivered to, for example, the coolant jacket 137 of the injection valve 132 (FIG. 8).

Figure 4:
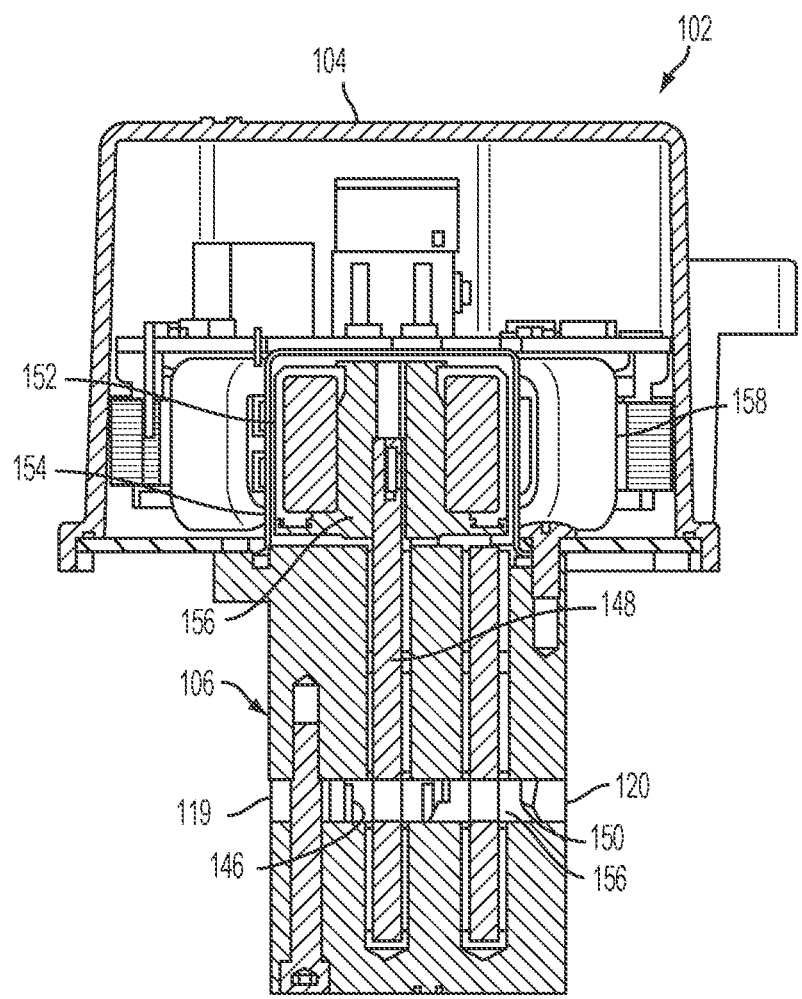
FIG. 4 is a cross-sectional side elevation view of a representative embodiment of a gear pump.

FIG. 4 illustrates a cross-sectional view of a representative embodiment of the pump 102 configured as a magnetically-driven gear pump that can be used in combination with any of the hydraulic circuit embodiments described herein. As described above, the pump 102 includes the pump-head portion 106 and the pump-driver portion 104. The pump-head portion 106 includes the inlet 119, and the outlet 120. The pump-head portion 106 also includes a pumping element configured as a driving pump gear 146 mounted on a shaft 148, along with a driven pump gear 150. A driven magnet 152 is coupled to the shaft 148, and the driven magnet 152 can be situated in a magnet cup 154. The magnet cup 154 extends into the pump-driver portion 104. The pump-head portion 106 and the magnet cup 154 together define a pump cavity 156 that is bathed by the liquid being pumped. In other words, the pump cavity 156 is defined by the fluid-wetted interiors of the pump-head portion 106 and the magnet cup 154. The magnet cup 154 separates the driven magnet 152 from electrical parts of the assembly that are kept dry (i.e., not wetted by the liquid being pumped).

Coaxially surrounding the magnet cup 154 is a stator 158 that is a respective component of the pump-driver portion 104. The stator 158 is located outside the pump cavity 156 and is magnetically coupled to the driven magnet 152 across the walls of the magnet cup 154 such that a changing magnetic field of the stator 158 induces rotation of the driven magnet 154 and the shaft 148 and, hence, of the pump gears 146, 150, to produce a flow of liquid. Alternatively, the pumping elements can be other rotary members, such as inter-digitating lobes which, when contra-rotated relative to each other, produce fluid flow.

Figure 11:
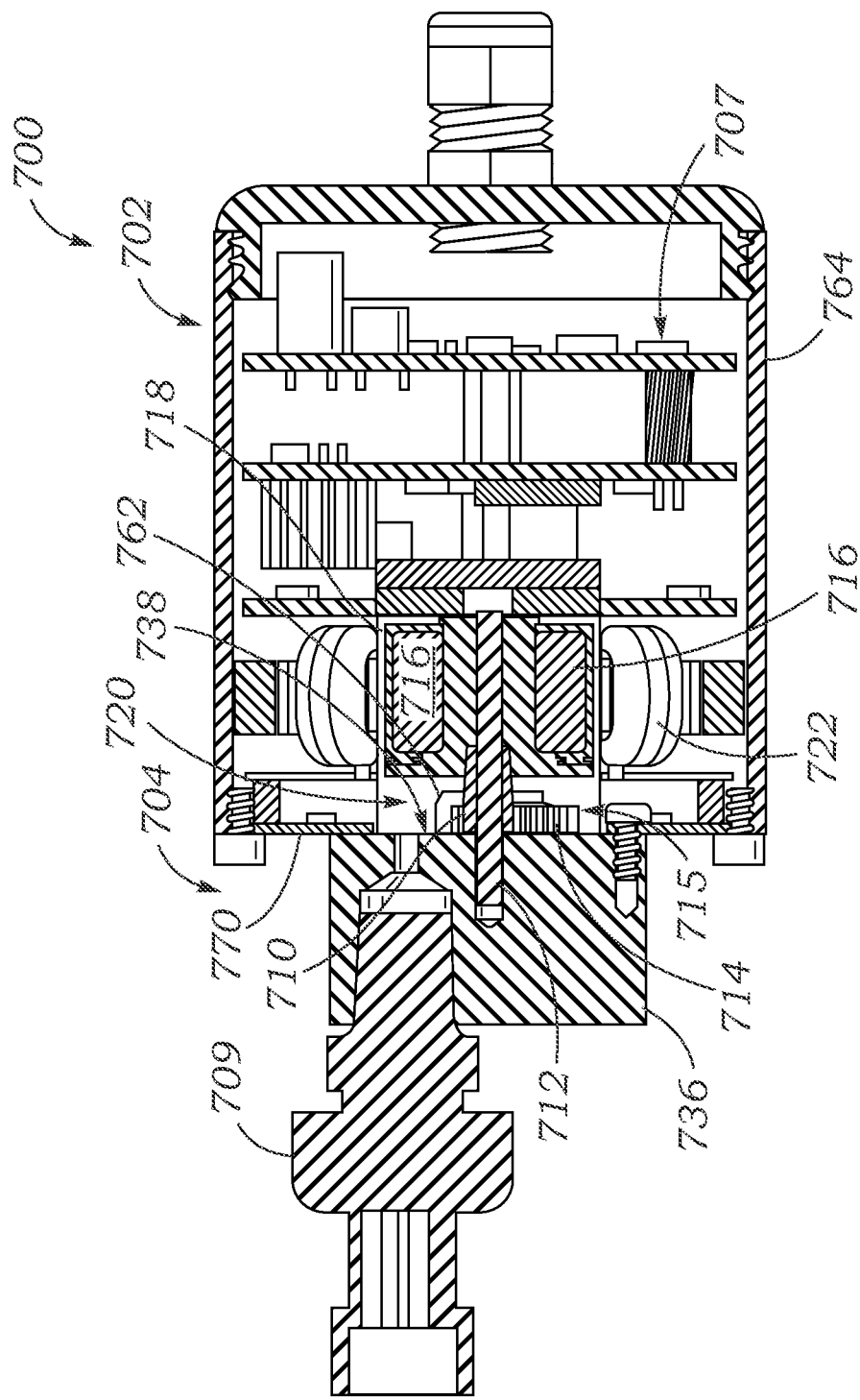
FIG. 11 is a cross-sectional view of another embodiment of a gear pump including a suction shoe.
Figure 12:
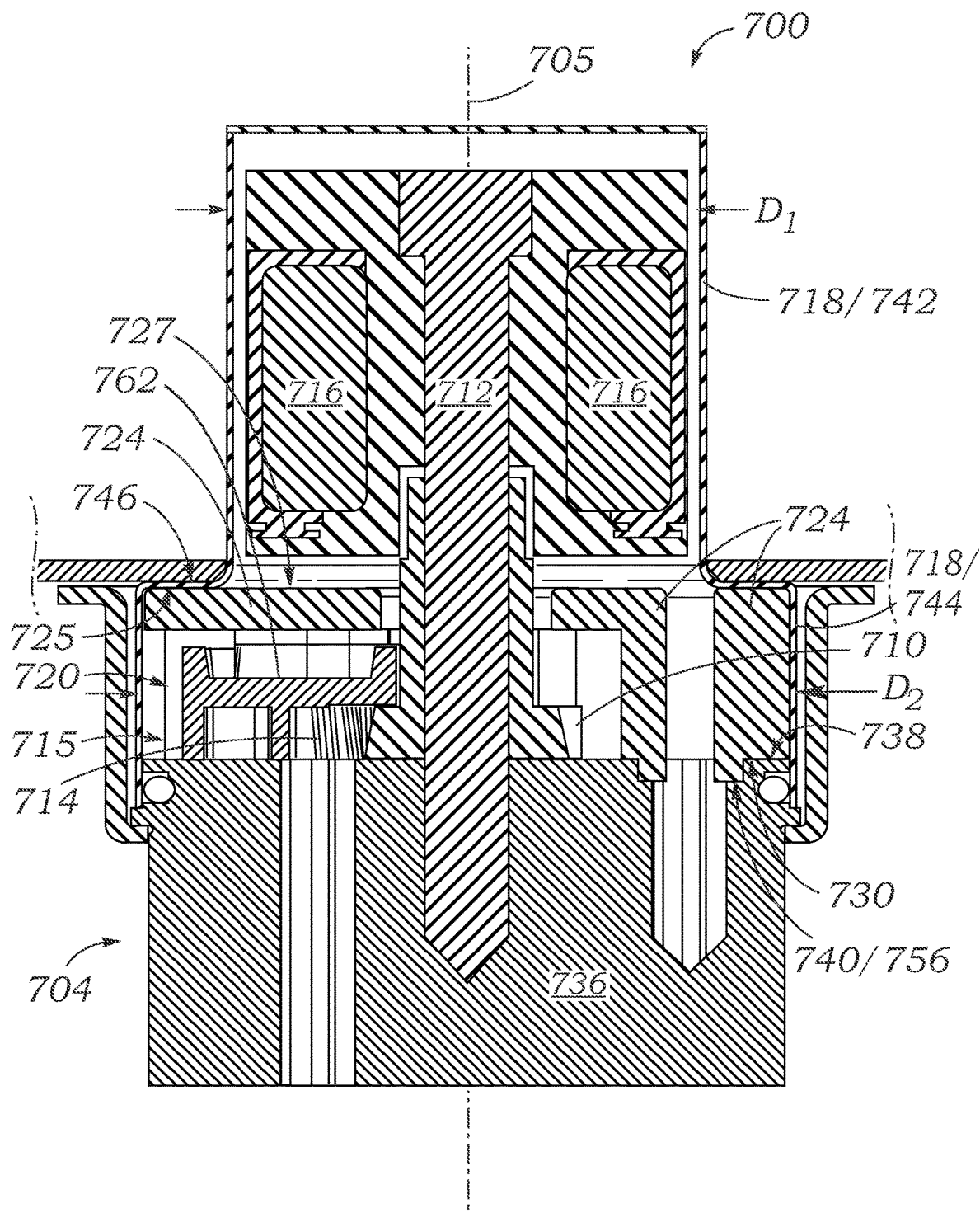
FIG. 12 is a cross-sectional view of another embodiment of the gear pump of FIG. 11 including a pressure-absorbing member situated in the pump cavity.

FIGS. 11 and 12 illustrate additional embodiments of gear pumps that can be used in combination with the hydraulic circuits described herein. FIG. 11 illustrates a pump 700 configured as a magnetically-driven gear pump and including a pump-driver portion 702 and a pump-head portion 704. The pump-driver portion 702 comprises an outer casing or housing 764. The pump-head portion 704 includes a pump body 736 (also referred to as a "fitting block") defining an inlet and an outlet (oriented perpendicular to the page and not visible in FIG. 11). The pump-head portion 704 also includes a driving gear 710 mounted on a shaft 712 and engaged or meshed with a driven gear 714 such that rotation of the driving gear 710 causes corresponding contra-rotation of the driven gear 714 to produce liquid flow. The pump gears 710, 714 can be situated in a gear cavity 715 (a portion of the "pump cavity" described below that also includes the interior surfaces of the inlet and outlet ports).

In the illustrated configuration, the pump 700 is configured as a suction shoe-style pump, and the pump gears 710, 714 can be situated to run on a surface 738 of the pump body 736. A permanent magnet 716 is coupled to the shaft 712, and the magnet 716 can be situated in a magnet cup 718. The magnet cup 718 extends into the pump-driver portion 702. The pump body 736 can be coupled to an end plate 770 and sealed against the rim of the magnet cup 718 such that the pump body 736, the gear cavity 715, and the magnet cup 718 of the pump-head portion 704 together define a pump cavity 720 that is bathed by the liquid being pumped. In other words, the pump cavity 720 is defined by the fluid-wetted interiors of the components of the pump-head portion 704. The magnet cup 718 separates the driven magnet 716 from electrical parts of the assembly in the pump-driver portion 702 that are kept dry (i.e., not wetted by the liquid being pumped). A suction shoe 762 is situated about the pump gears 710, 714 in the gear cavity on the surface 738 of the pump body 736, and seals the inflow side of the gears from the outflow side of the gears.

Coaxially surrounding the magnet cup 718 is a stator 722 that is a respective component of the pump-driver portion 702. The stator 722 is located outside the pump cavity 720 and is magnetically coupled to the magnet 716 across the walls of the magnet cup 718 such that a changing magnetic field of the stator 722 induces rotation of the magnet 716 and the shaft 712 and, hence, of the pump gears 710, 714, to produce a flow of liquid, similar to the pump 102 of FIG. 4. The stator 722 can comprise wire windings, which can be selectively energized by electronics 707 disposed in the housing 764. In the illustrated embodiment, the magnet cup 718, the stator 722, and the associated electrical components 707 of the pump-driver portion 702 are disposed in the housing 764, which can be coupled to the pump body 736 to form the pump 700. In certain embodiments, the pump body 736 also includes a pressure transducer 709 (which can be in fluid communication with the outlet port of the pump-head portion 704, for example).

FIG. 12 illustrates another configuration of the pump 700 including a pressure-absorbing member 724 disposed in the pump cavity 720 and, more particularly, in the gear cavity 715. The pressure-absorbing member 724 can be a compliant member that is configured to compress or contract in response to an increase in pressure in the liquid inside the pump cavity. In certain embodiments, the pressure increase can be static, such as accompanying freezing of the liquid inside the pump cavity, or dynamic, such as pressure fluctuations in the liquid as it is being pumped (also referred to as "pressure pulses"). Upon relief of the increased pressure condition, the pressure-absorbing member 724 can be configured to expand or otherwise return to its original non-deformed state.

In certain embodiments, the pressure-absorbing member 724 can be made from any of various rubber compounds, such as silicone rubber, etc. The pressure-absorbing member 724 can also be made from any of various closed-cell foam materials, such as fluorinated silicone closed-cell foam. In certain embodiments, the pressure-absorbing member 724 can be non-porous to prevent the ingress of liquid into the body of the pressure-absorbing member, or can be porous, depending upon the particular requirements of the application.

The pressure-absorbing member 724 can be situated in the pump cavity 720 such that a surface 730 of the pressure-absorbing member contacts the surface 738 of the pump body 736. In the illustrated configuration, the magnet cup 718 can have a first portion 742 (the upper portion in FIG. 12) having a diameter $D_1$, and a "flared" second portion 744 having a diameter $D_2$ that is greater than the diameter $D_1$. Due to the difference between the diameters $D_1$ and $D_2$, the magnet cup 718 can define an annular intermediate portion 746 having a surface that is substantially perpendicular to a longitudinal axis 705 of the pump. Thus, the magnet 716 can be located in the first portion 742 of the magnet cup 718, while the second portion 746 can be configured to receive the pressure-absorbing member 724 such that an interior surface 725 of the intermediate portion 746 contacts an upper surface 727 of the pressure-absorbing member. An extension portion 740 of the main body of the pressure-absorbing member 724 can also be received in a corresponding recess 756 defined in the surface 738 of the pump body 736. In this manner, the pressure-absorbing member 724 can be captured between the intermediate portion 746 of the magnet cup and the surface 738 of the pump body 736. The pressure-absorbing member can also be prevented from being displaced perpendicular to the longitudinal axis 705 of the pump (e.g., laterally) by the extension portion 740. The extension portion 740 and/or the shaft 712 can also prevent rotation of the pressure-absorbing member 724 within the cavity.

In the illustrated configuration, the pressure-absorbing member 724 can extend over and accommodate the pump gears 710, 714, and the suction shoe 762. In this manner, the pressure-absorbing member 724 can prevent unwanted displacement of the suction shoe 762 and, hence, of the pump gears 710, 714, within the pump cavity. The pump 700 and the pressure-absorbing member 724 are described in greater detail in U.S. Provisional Patent Application No. 62/421,116 filed on Nov. 11, 2016, which is incorporated herein by reference. The hydraulic systems described herein may also include other types of pumps, such as rotary vane pumps, diaphragm pumps, piston pumps, etc., depending upon, for example, the particular application and flow characteristics desired.

The hydraulic circuit embodiments described herein can offer significant advantages over known hydraulic circuits and methods for delivering reagent solutions in SCR systems. For example, the embodiments described herein can provide a first relatively low-volume flow of liquid at a relatively high pressure suitable for injection into an exhaust stream, along with a second relatively high-volume flow at a lower pressure suitable for cooling the injector or other component, without the need for a second powered pump unit. More specifically, by incorporating a venturi pump into the circuit and utilizing a portion of the relatively high-pressure flow produced by the pump as the working fluid for the venturi pump, a second flow of liquid can be produced having a relatively high flow rate without the need for an additional powered pump unit. This can avoid the increased weight, cost, and energy requirements associated with providing such a flow with a larger pump, or with two pumps.

Additionally, the recirculating venturi pump flow of liquid produced by the venturi pump can also reduce or prevent decomposition of the aqueous reagent. This can allow the reservoir 108 to contain a larger volume of reagent, and extend the length of time and/or distance over which the system can operate between refills of the reservoir. Circulating the liquid reagent through the cooling feature can also pre-heat the liquid and improve the atomization characteristics of the aqueous reagent at the injector.

Figure 5:
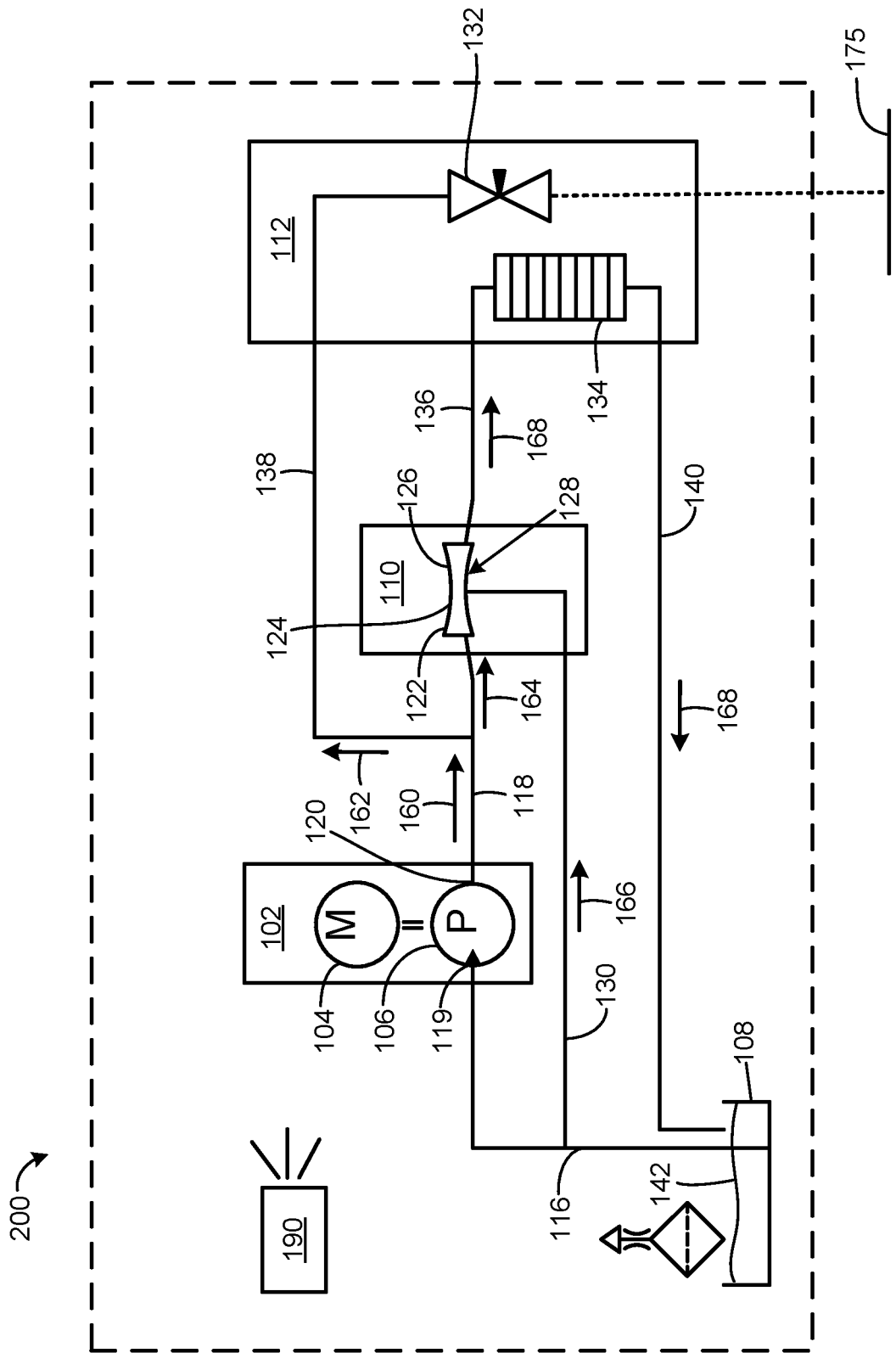
FIG. 5 is a schematic illustration of the hydraulic circuit of FIG. 1 incorporated into an inkjet printing system.

The disclosed systems and hydraulic circuits can also be used in a variety of other applications, including SCR systems in power plants, marine engines, locomotives, diesel-electric generators, other applications involving internal combustion engines, and particularly compression-ignition engines. The disclosed systems can also be used in other applications including inkjet printers or print heads, fuel injection systems, or any other system including a liquid-cooled fluid utility unit. For example, FIG. 5 illustrates the hydraulic circuit 100 of FIG. 1 located in an inkjet printer system 200, wherein the injector 132 is an inkjet print head and the liquid 142 is an ink. The injector 132 can be configured to apply a flow of ink supplied by the pump 102 to a substrate 175. Furthermore, it should be understood that the embodiments described herein can be used in combination with other non-aqueous liquids, fluids, and/or gases. In some embodiments, the venturi pump 110 can also be used to purge the hydraulic circuit (e.g., during engine shut down).

Figure 6:
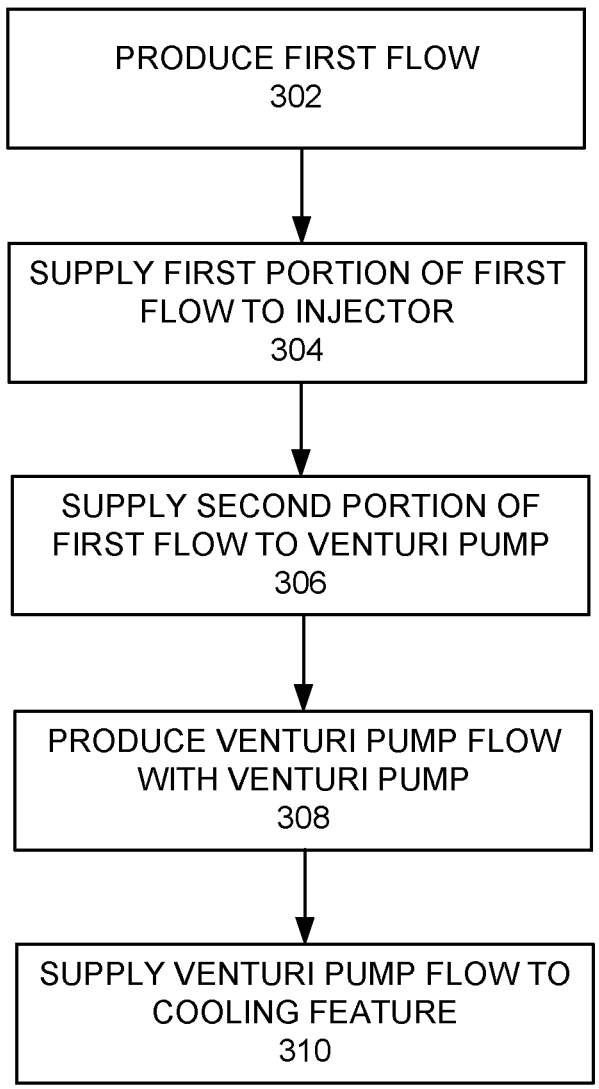
FIG. 6 is a process flow diagram illustrating a representative method of producing a flow of liquid.

FIG. 6 is a process flow diagram illustrating a method of supplying a liquid to a fluid utility unit, such as the injection valve 132 of FIG. 8. At process block 302, a first flow of a liquid can be produced from a reservoir with a pump.

At block 304, a first portion of the first flow of the liquid can be supplied to a fluid utility unit.

At block 306, a second portion of the first flow of the liquid can be supplied to a venturi pump.

At block 308, a second flow of the liquid can be produced from the reservoir and combined with the second portion of the first flow of the liquid by the venturi pump to produce a venturi pump liquid flow.

At block 310, the venturi pump liquid flow can be supplied to a cooling feature of the fluid utility unit.

Representative Computing Environment

Figure 7:
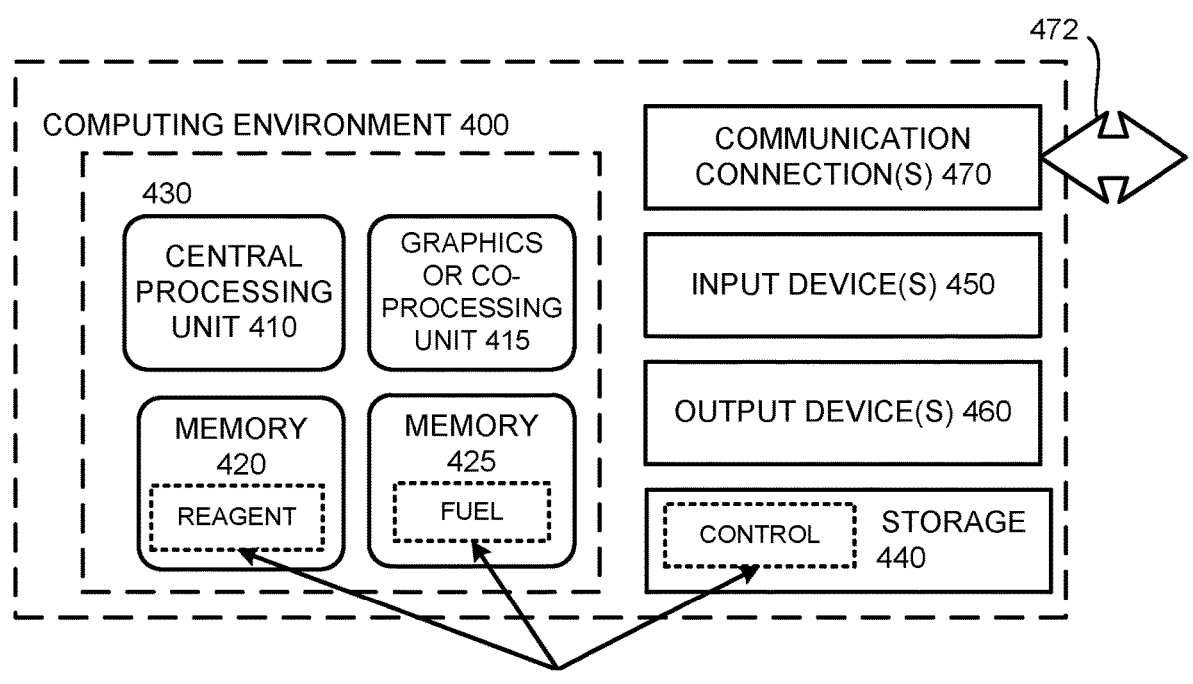
FIG. 7 is a schematic block diagram of a representative computing environment.

FIG. 7 depicts a generalized example of a suitable computing environment 400 in which software and control algorithms for the described innovations may be implemented, and which may be associated with, for example, the controller 190 of FIG. 1. The computing environment 400 is not intended to suggest any limitation as to scope of use or functionality, as the innovations may be implemented in diverse general-purpose or special-purpose computing systems. For example, the computing environment 400 can be any of a variety of computing devices (e.g., an engine control unit, programmable automation controller, desktop computer, laptop computer, server computer, tablet computer, gaming system, mobile device, etc.).

With reference to FIG. 7, the computing environment 400 includes one or more processing units 410, 415 and memory 420, 425 (e.g., for storing data indicative of flow rates of aqueous reagent and/or fuel). In FIG. 7, this basic configuration 430 is included within a dashed line. The processing units 410, 415 execute computer-executable instructions. A processing unit can be a general-purpose central processing unit (CPU), a processor in an application-specific integrated circuit (ASIC) or any other type of processor. In a multi-processing system, multiple processing units execute computer-executable instructions to increase processing power. For example, FIG. 7 shows a central processing unit 410 as well as a graphics processing unit or co-processing unit 415. The tangible memory 420, 425 may be volatile memory (e.g., registers, cache, RAM), non-volatile memory (e.g., ROM, EEPROM, flash memory, etc.), or some combination of the two, accessible by the processing unit(s). The memory 420, 425 stores software 480 implementing one or more innovations described herein, in the form of computer-executable instructions suitable for execution by the processing unit(s).

A computing system may have additional features. For example, in some embodiments, the computing environment 400 includes storage 440, one or more input devices 450, one or more output devices 460, and one or more communication connections 470. An interconnection mechanism (not shown) such as a bus, controller, or network, interconnects the components of the computing environment 400. Typically, operating system software (not shown) provides an operating environment for other software executing in the computing environment 400, and coordinates activities of the components of the computing environment 400.

The tangible storage 440 may be removable or non-removable, and includes flash memory, magnetic disks, or any other medium that can be used to store information in a non-transitory way and can be accessed within the computing environment 400. The storage 440 stores instructions for the software 480 implementing one or more innovations described herein (e.g., for storing data of a trajectory of a wafer stage).

The input device(s) 450 may be, for example: any of various sensors; a touch input device, such as a keyboard, mouse, pen, or trackball; a voice input device; a scanning device; another device that provides input to the computing environment 400; or combinations thereof. For video encoding, the input device(s) 450 may be a camera, video card, TV tuner card, or similar device that accepts video input in analog or digital form, or a CD-ROM or CD-RW that reads video samples into the computing environment 400. The output device(s) 460 may be a display, printer, speaker, CD-writer, or another device that provides output from the computing environment 400.

The communication connection(s) 470 enable communication over a communication medium to another computing entity. The communication medium conveys information, such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones, other mobile devices that include computing hardware, or programmable automation controllers). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

General Considerations

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The disclosed technology is not restricted to the details of any foregoing embodiments. The disclosed technology extends to any novel one, or any novel combination, of the features disclosed in this specification (including any accompanying claims, abstract and drawings), or to any novel one, or any novel combination, of the steps of any method or process so disclosed.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods. As used herein, the terms "a", "an", and "at least one" encompass one or more of the specified element. That is, if two of a particular element are present, one of these elements is also present and thus "an" element is present. The terms "a plurality of" and "plural" mean two or more of the specified element.

In the following description, certain terms may be used such as "up," "down,", "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

In some examples, values, procedures, or apparatus' are referred to as "lowest," "best," "minimum," or the like. It will be appreciated that such descriptions are intended to indicate that a selection among many used functional alternatives can be made, and such selections need not be better, smaller, or otherwise preferable to other selections.

As used herein, the term "and/or" used between the last two of a list of elements means any one or more of the listed elements. For example, the phrase "A, B, and/or C" means "A", "B,", "C", "A and B", "A and C", "B and C", or "A, B, and C."

As used herein, the term "coupled" generally means physically coupled or linked and does not exclude the presence of intermediate elements between the coupled items absent specific contrary language.

As used herein, a "pump-head" is an assembly including a pump element, at least one inlet, and at least one outlet.

As used herein, a "pump" is a pump-head including the pump-driver portion or mover.

Unless otherwise indicated, all numbers expressing quantities of components, molecular weights, percentages, temperatures, pressures, flow rates, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under test conditions/methods familiar to those of ordinary skill in the art. When directly and explicitly distinguishing embodiments from discussed prior art, the embodiment numbers are not approximates unless the word "about" is recited. Furthermore, not all alternatives recited herein are equivalents.

In view of the many possible embodiments to which the principles of the disclosed technology may be applied, it should be recognized that the illustrated embodiments are only preferred examples and should not be taken as limiting the scope of the disclosure. Rather, the scope of the disclosure is at least as broad as the following claims.

The invention claimed is:

1. A hydraulic circuit, comprising:
a pump in fluid communication with a reservoir containing a liquid to be pumped, the pump including an inlet and an outlet;
a venturi pump in fluid communication with the reservoir and with the outlet of the pump;
an injection valve including a cooling feature, the injection valve being in fluid communication with the outlet of the pump and configured to dispense liquid supplied to the injection valve by the pump, the cooling feature being in fluid communication with the venturi pump;
wherein the pump is configured to produce a first flow of liquid, and the hydraulic circuit is configured to supply a first portion of the first flow of liquid to the injection valve for dispensing by the injection valve and a second portion of the first flow of liquid to the venturi pump.

2. The hydraulic circuit of claim 1, wherein the venturi pump is configured to produce a second flow of liquid from the reservoir and combine the second flow of liquid with the second portion of the first flow of liquid to produce a venturi pump liquid flow.

3. The hydraulic circuit of claim 2, wherein the hydraulic circuit is configured to deliver the venturi pump liquid flow to the cooling feature.

4. The hydraulic circuit of claim 3, wherein the hydraulic circuit is configured to return the venturi pump liquid flow from the cooling feature to the reservoir.

5. The hydraulic circuit of claim 1, wherein the injection valve and the venturi pump are fluidly connected in parallel.

6. The hydraulic circuit of claim 1, wherein the venturi pump is incorporated into the pump, or into the injection valve.

7. The hydraulic circuit of claim 1, wherein the liquid is an aqueous ammonia solution or a urea solution.

8. The hydraulic system of claim 1, wherein the pump is a gear pump.

9. A selective catalytic reduction system including the hydraulic circuit of claim 1.

10. A vehicle including the selective catalytic reduction system of claim 9.

11. A method, comprising:
with a pump, producing a first flow of a liquid from a reservoir;
supplying a first portion of the first flow of the liquid to an injection valve;
supplying a second portion of the first flow of the liquid to a venturi pump;
with the venturi pump, producing a second flow of the liquid from the reservoir and combining the second flow of the liquid with the second portion of the first flow of the liquid to produce a venturi pump liquid flow; and
supplying the venturi pump liquid flow to a cooling feature of the injection valve.

12. The method of claim 11, further comprising returning the venturi pump liquid flow to the reservoir.

13. The method of claim 11, further comprising injecting the first portion of the first flow of the liquid into an exhaust stream of an internal combustion engine with the injection valve.

14. The method of claim 11, wherein the injection valve and the venturi pump are fluidly connected in parallel.

15. The method of claim 11, wherein the liquid is an aqueous ammonia solution or a urea solution.

16. The method of claim 11, wherein the pump is a gear pump.

17. One or more non-transitory computer-readable storage media storing computer-executable instructions for causing a computer to perform the method of claim 11.

18. A system, comprising:
a pump in fluid communication with a reservoir containing a liquid to be pumped, the pump including an inlet and an outlet, the pump being configured to produce a first flow of liquid;
a venturi pump in fluid communication with the reservoir and with the outlet of the pump, the venturi pump being configured to receive a portion of the first flow of liquid, to produce a second flow of liquid from the fluid reservoir, and to combine the received portion of the first flow of liquid with the second flow of liquid to produce a venturi pump flow of liquid;

an internal combustion engine;

an injection valve including a coolant jacket, the injection valve being in fluid communication with the outlet of the pump and configured to inject liquid supplied by the pump into exhaust gases produced by the internal combustion engine, the coolant jacket being in fluid communication with the venturi pump and configured to receive the venturi pump flow of liquid; and a controller configured to vary a flow rate of the first flow of liquid produced by the pump based at least in part on a flow rate of fuel supplied to the internal combustion engine.

19. The system of claim 18, wherein the liquid is an aqueous ammonia solution or a urea solution.

20. A vehicle including the system of claim 18.

* * * * *